US 7,428,854 B2

(12) United States Patent
Moore et al.

(10) Patent No.: US 7,428,854 B2
(45) Date of Patent: Sep. 30, 2008

(54) GEARBOX

(75) Inventors: Adrian Moore, Cold Ash (GB); Paul Pomfret, Cold Ash (GB); Andrew Heard, Indianapolis, IN (US); Andrew McDougall, Workingham (GB); Christopher Cholmeley, Thatcham (GB)

(73) Assignee: Xtrac Limited, Berkshire (GB)

( * ) Notice: Subject to any disclaimer, the term of this patent is extended or adjusted under 35 U.S.C. 154(b) by 315 days.

(21) Appl. No.: 11/437,337

(22) Filed: May 19, 2006

(65) Prior Publication Data

US 2007/0034032 A1 Feb. 15, 2007

(30) Foreign Application Priority Data

May 21, 2005 (GB) .................................. 0510421.1

(51) Int. Cl.
*F16H 3/38* (2006.01)
(52) U.S. Cl. ....................................................... 74/339
(58) Field of Classification Search .................. 74/335, 74/339; 192/48.4, 48.5, 48.6
See application file for complete search history.

(56) References Cited

U.S. PATENT DOCUMENTS 3,476,226 A 11/1969 Massey
4,111,288 A * 9/1978 Fogelberg .................... 192/38

(Continued)

FOREIGN PATENT DOCUMENTS

EP 0 391 604 10/1990

(Continued)

OTHER PUBLICATIONS

British Search Report dated Oct. 10, 2005 corresponding to Application No. GB 0501421.1.

(Continued)

*Primary Examiner*—Dirk Wright
(74) *Attorney, Agent, or Firm*—Fay Sharpe LLP

(57) ABSTRACT

A mainshaft assembly for a gearbox and a gearbox embodying such a mainshaft assembly are disclosed. The mainshaft assembly comprises a mainshaft, and several drive gears, each carried for rotation about the mainshaft, each drive gear having a different number of teeth. The assembly includes first and a second hub, each being associated with a respective drive gear, each hub having a dog ring operable to selectively couple with the drive gear causing it to rotate with the hub or uncouple from the drive gear to allow the drive gear to rotate with respect to the hub. A respective drive connection means comprising a cage and rollers is associated with each hub and is operative to connect or disconnect the hub to the mainshaft for rotation with it or to allow rotation with respect to it. Upon connection of both first and second hub by their respective dog rings to each corresponding drive gear, the drive connection means operates to connect one of the hubs to the mainshaft when torque is applied to the mainshaft in a first direction and to connect the other one of the hubs to the mainshaft when torque is applied to the mainshaft in the opposite direction. This enables selection of a gear ratio provided by one or other drive gear to be achieved by reversal of the torque being handled by the gearbox (as happens, for example, when a vehicle goes through a transition from accelerative drive to coasting). There is no delay while drive engagement means take up or disengage drive.

28 Claims, 16 Drawing Sheets

U.S. PATENT DOCUMENTS

| | | | |
|---|---|---|---|
| 4,398,432 A | | 8/1983 | Quick |
| 5,131,285 A | | 7/1992 | Weismann et al. |
| 5,178,250 A | * | 1/1993 | Ashikawa et al. ............. 192/38 |
| 5,301,565 A | * | 4/1994 | Weismann et al. ........ 74/336 R |

FOREIGN PATENT DOCUMENTS

| JP | 60-125420 | 7/1985 |
|---|---|---|
| SU | 1237824 A1 | 6/1986 |
| WO | WO 01/11272 A1 | 2/2001 |

OTHER PUBLICATIONS

European Search Report for Application No. EP 06 25 2624.

\* cited by examiner

GEARBOX

BACKGROUND TO THE INVENTION

1. Field of the Invention

This invention relates to a gearbox. It has particular, but not exclusive, application for use in a high-performance motor vehicle such as a sports car or a racing car.

2. Summary of the Prior Art

A conventional manual automotive gearbox has one particular disadvantage when applied to a vehicle from which maximum performance is to be extracted. It is necessary to remove engine torque from the input to the gearbox when the gear ratio is to be changed, typically by interrupting drive through a friction clutch. This results in the acceleration of the vehicle being interrupted during the period for which the clutch is open. In a conventional gearbox, it is necessary to remove torque from immediately before a currently-selected gear is disengaged until a new gear is selected.

The most common arrangement in general automotive use mounts a gear onto a hub using a bearing or bush arrangement. The hub is joined to the gear shaft through a splined or similar coupling. Mounted on the hub is a sliding ring system which can slide on the hub to engage a gear in order to couple that gear to the hub for rotation, thus permitting drive to pass from the gear to the shaft. In some instances the hub may be integral with the gear shaft. The sliding ring system can be either a dog clutch ring or a synchronizer ring assembly; many different sizes and types are available. In a sequential gearbox, the sliding ring system is actuated by a selector fork, which in turn is actuated by the rotation of a gearchange barrel upon which is a cam profile. As the barrel is rotated the cam profile causes the correct selector fork to move at the correct time.

In operation of such a system, to effect a gearchange, one gear is de-selected, and then the subsequent gear selected. In order for the sliding ring system to engage and disengage with the gear the drive torque needs to be cut, this is typically done through the engine to gearbox clutch and/or an electronic engine cut. A cut in the engine torque for the required time to allow the gear to disengage results in the rate of vehicle acceleration being reduced. In certain applications, for example in motor sport, it is not desirable for the vehicle acceleration rate to reduce during a gear change.

SUMMARY OF THE INVENTION

An aim of this invention is to provide a gearbox that enables gear changes to be made with the minimum of reduction in the time period for which engine torque need be reduced.

From a first aspect, this invention provides a mainshaft assembly for a gearbox, the mainshaft assembly comprising:
  a mainshaft;
  a first and a second drive gear, each carried for rotation about the mainshaft, each drive gear having a different number of teeth;
  a first and a second hub, each hub being associated with a respective drive gear, each hub having engagement means operable to selectively couple with the drive gear causing it to rotate with the hub or uncouple from the drive gear to allow the drive gear to rotate with respect to the hub;
  respective drive connection means associated with each hub being operative to connect or disconnect the hub to the mainshaft for rotation with it or to allow rotation with respect to it;
  wherein, upon connection of both first and second hub by their respective engagement means to each corresponding drive gear, the drive connection means operates to connect one of the hubs to the mainshaft when torque is applied to the mainshaft through the hub and to connect the other one of the hubs (typically exclusively) to the mainshaft when torque is applied to the hub through the mainshaft.

This enables selection of a gear ratio provided by one or other drive gear to be achieved by reversal of the torque being handled by the gearbox (as happens, for example, when a vehicle goes through a transition from accelerative drive to coasting). There is no delay while drive engagement means take up or disengage drive.

For example, when the gearbox is transmitting torque in a direction that corresponds to acceleration of a vehicle to which it is fitted, the connection means operates to connect the hub that is associated with the drive gear that has the higher drive ratio. Thus, when the vehicle is accelerating, engagement of a second hub with its drive gear effects an up-change, and an automatic down-change when the vehicle is coasting.

In typical embodiments, at least one hub is associated with two drive gears, the engagement means being operable to selectively couple with one or other drive gear or uncouple from both drive gears. This can be used to increase the number of ratios provided in a gearbox while keeping the number of components to a minimum. In such embodiments, drive gears that provide neighbouring ratios do not share a hub. The drive gears for successive speeds may be carried on successive hubs disposed along the mainshaft. For instance, in the case of a four-speed gearbox, ratios 1 and 3 are provided by drive gears associated with a first hub and ratios 2 and 4 are provided by drive gears associated with a second hub.

Suitably, each engagement means includes a dog clutch that can engage with or disengage from dogs on a drive gear. The dog clutch may be embodied by a dog ring that is carried on the hub. Typically, the dog ring is carried such that it can slide axially on the hub and is constrained to rotate with the hub, the dog ring being coupled or uncoupled by sliding upon the hub. For example, the dog ring may be splined to the hub.

In preferred embodiments, the connection means includes connection elements movable between a deployed position in which they prevent relative movement between the hub and the mainshaft and a withdrawn position in which such relative movement is allowed. For example, the connection elements may be cylindrical metal rollers. In the withdrawn position, each connection element may be received within a respective recess in one of the mainshaft and the hub. In the deployed position, the connection elements may project from the recesses to engage with formations in the other of the mainshaft and the hub. The connection means typically further includes a control component to move the connection elements between their withdrawn and their deployed position. The control component may comprise a hollow cylindrical cage that surrounds the mainshaft and which extends in an annular space between the hubs and the mainshaft. The cage may include slots within which the connection elements are located. The connection elements may be moved between their withdrawn and their deployed position by rotation of the cage with respect to the mainshaft. Rotation of the cage in a first direction may be effected by relative movement between the cage and the mainshaft caused by the connection elements being rotated by the hub and rotation of the cage in the opposite direction is effective by relative movement between the cage and a hub. In alternative embodiments, the control component may be a ring-shaped component having lobes between which the connection elements are retained. Typically, the lobes have a greater circumferential extent around the ring than the connection elements. Typically, in such embodiments, a limited amount of relative rotational movement is provided between the ring-shaped components.

From a second aspect, this invention provides a gearbox that includes a mainshaft assembly that embodies the first aspect of the invention.

In such a gearbox, each of the drive gears of the mainshaft assembly is in mesh with a respective laygear. Typically, the laygears are constrained to rotate together.

A gearbox embodying this aspect of the invention typically includes a selector assembly operable to engage or disengage the engagement means. The selector assembly typically operates sequentially. This is the preferred form of selector for use in competition.

A typical configuration of the gearbox uses the layshaft as its input and the mainshaft as its output. However, in alternative embodiments, the opposite arrangement may be adopted.

DETAILED DESCRIPTION OF THE PREFERRED EMBODIMENTS

Embodiments of the invention will now be described in detail, by way of example, and with reference to the accompanying drawings.

Each embodiment described is a four-speed gearbox intended for competition use. However, it will be seen that the principles of its construction could be extended in a straightforward manner to a gearbox having a larger number of speeds or applications. The embodiment described may also provide four forward speeds in a gearbox in which further forward speeds are provided using conventional means.

Figure 1:
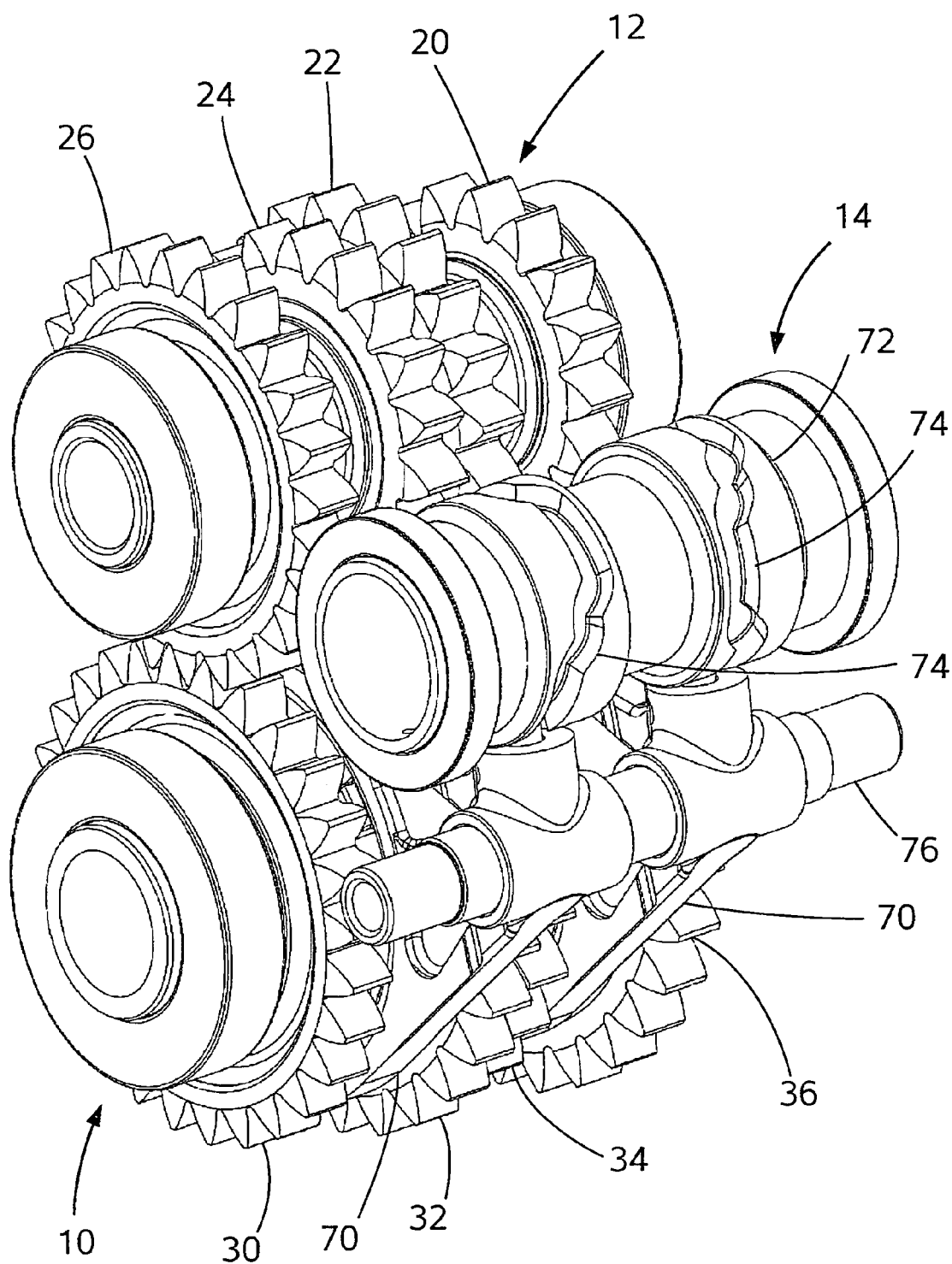
FIG. 1 is a perspective view of the main internal components of a gearbox being a first embodiment of the invention.
Figure 2:
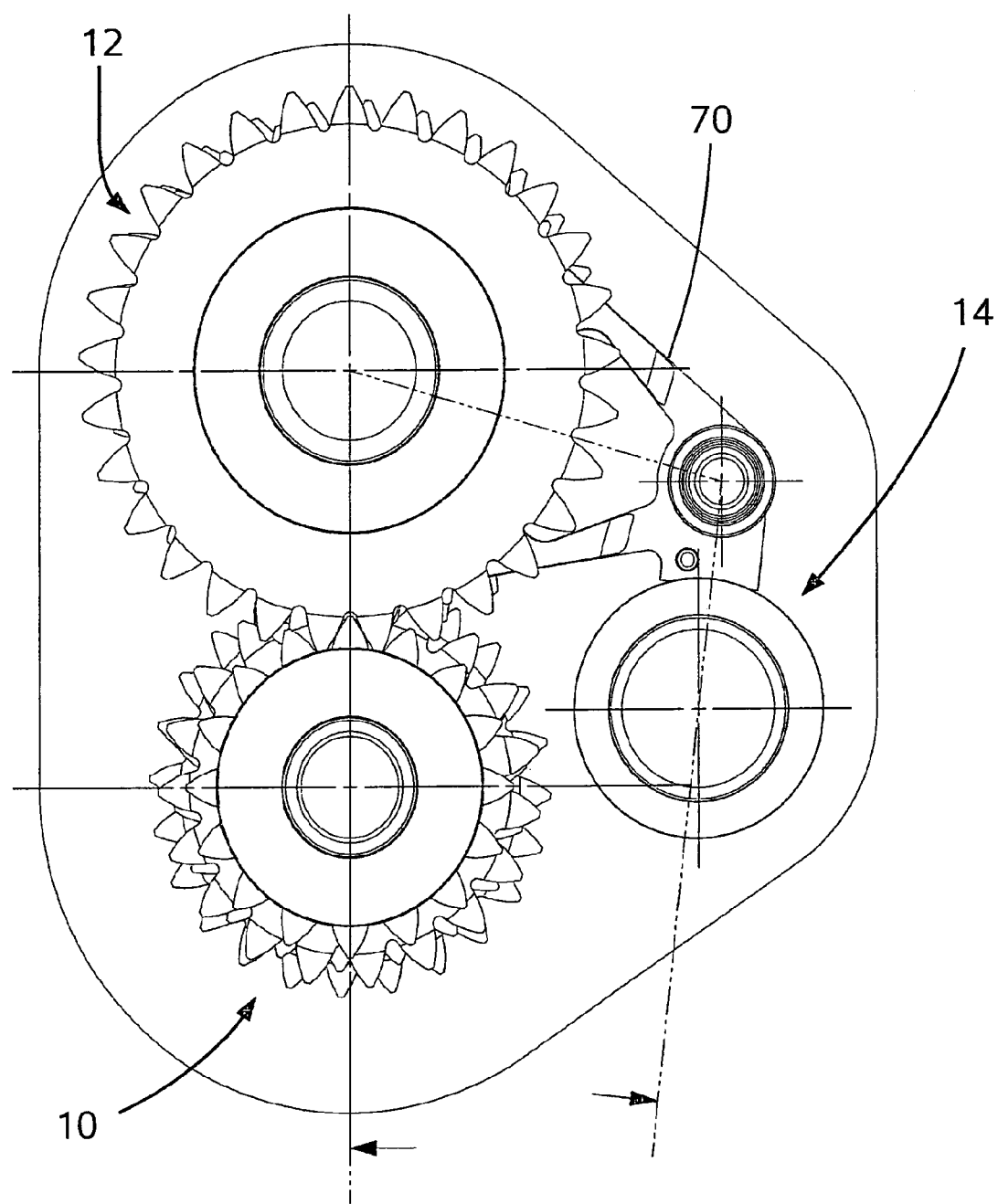
FIG. 2 is an end view of the main internal components of the gearbox of FIG. 1.
Figure 3:
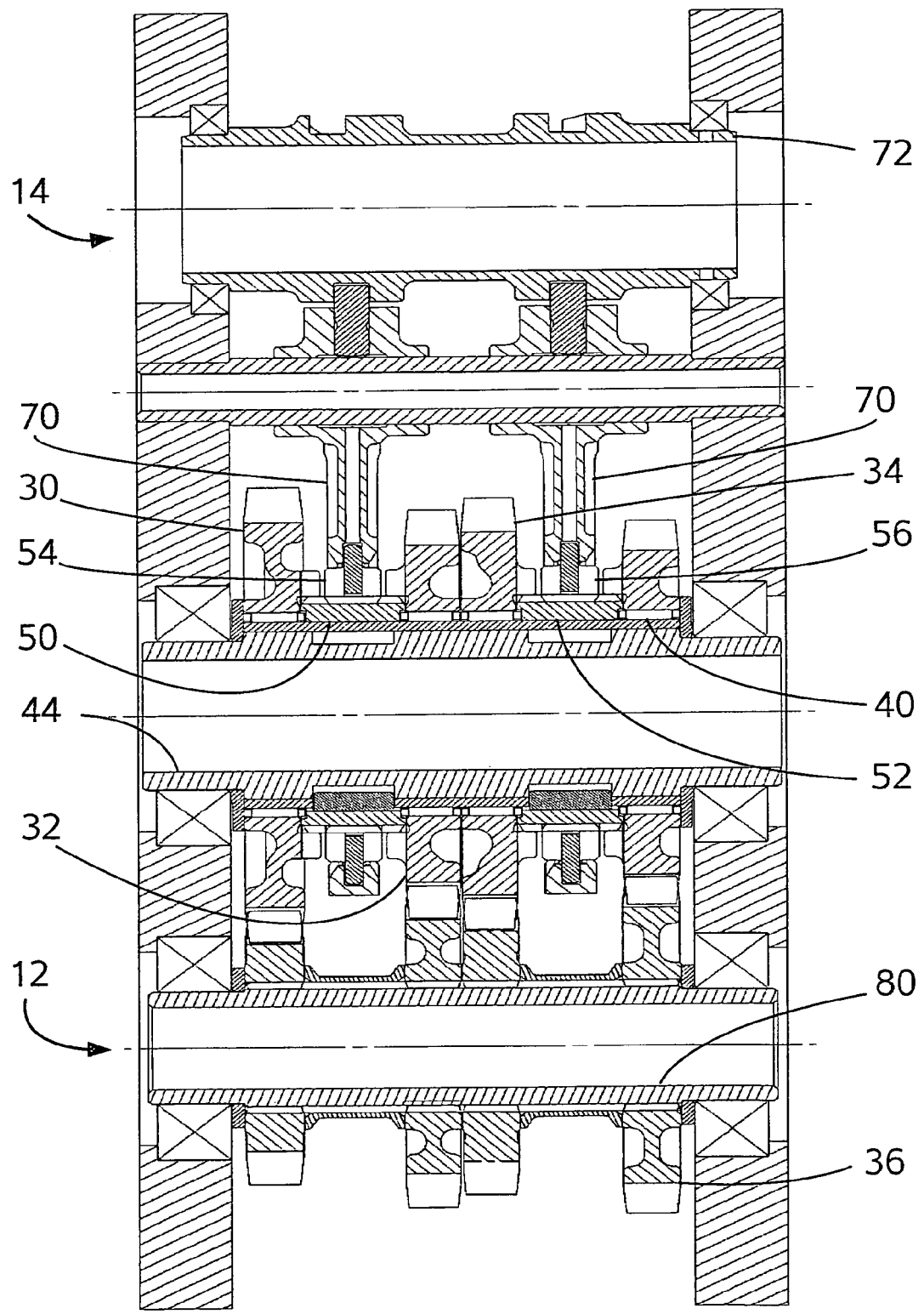
FIG. 3 is a cross-sectional view of the main internal components of the gearbox of FIG. 1.

With reference first to FIGS. 1 to 3, the gearbox comprises two principal shaft assemblies—a mainshaft assembly 10 and a layshaft assembly 12—and a selector assembly 14. Drive from the engine passes through the clutch and enters the gearbox to drive the layshaft assembly 10. The output of the gearbox is taken from the mainshaft assembly 10. Ratio selection is performed on the mainshaft and is controlled by the selector assembly 14.

The layshaft assembly 12 comprises four differently-sized spur gears 20, 22, 24, 26 carried upon a rotatable shaft 80 for rotation about an axis within the gearbox. The spur gears 20, 22, 24, 26 and the layshaft are coupled by splines so as they rotate together; that is to say, relative rotation between the spur gears is prevented.

Figure 4:
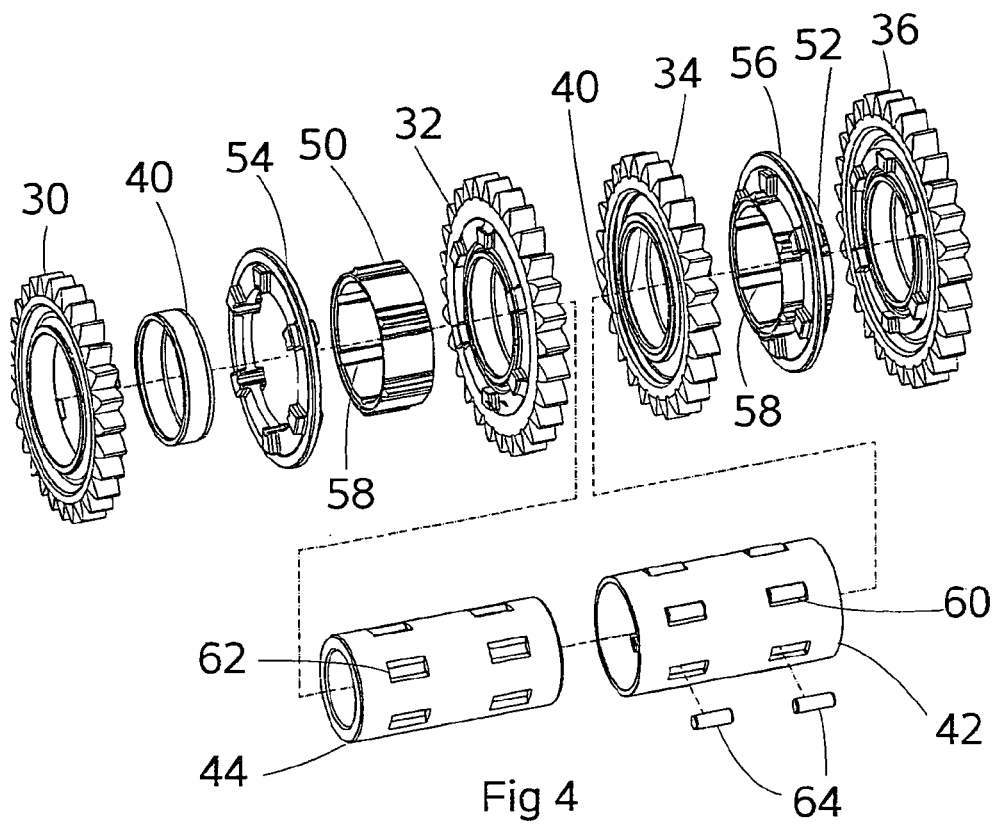
FIG. 4 is an exploded view of the mainshaft assembly of the embodiment of FIG. 1.
Figure 5:
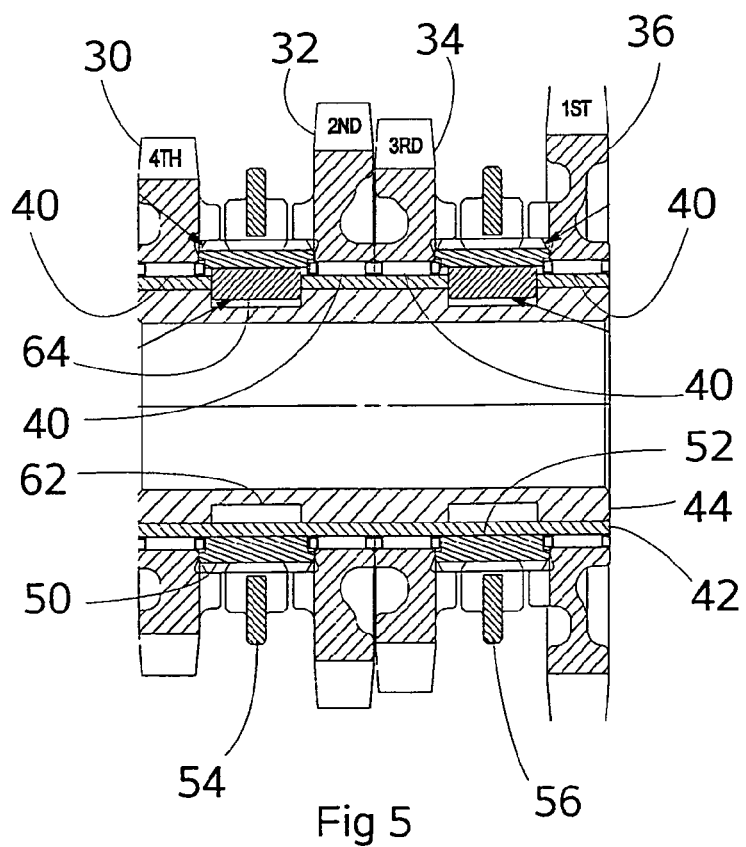
FIG. 5 is a cross-sectional view of a mainshaft assembly of the embodiment of FIG. 1 with no gear selected (i.e., in neutral)
Figure 6:
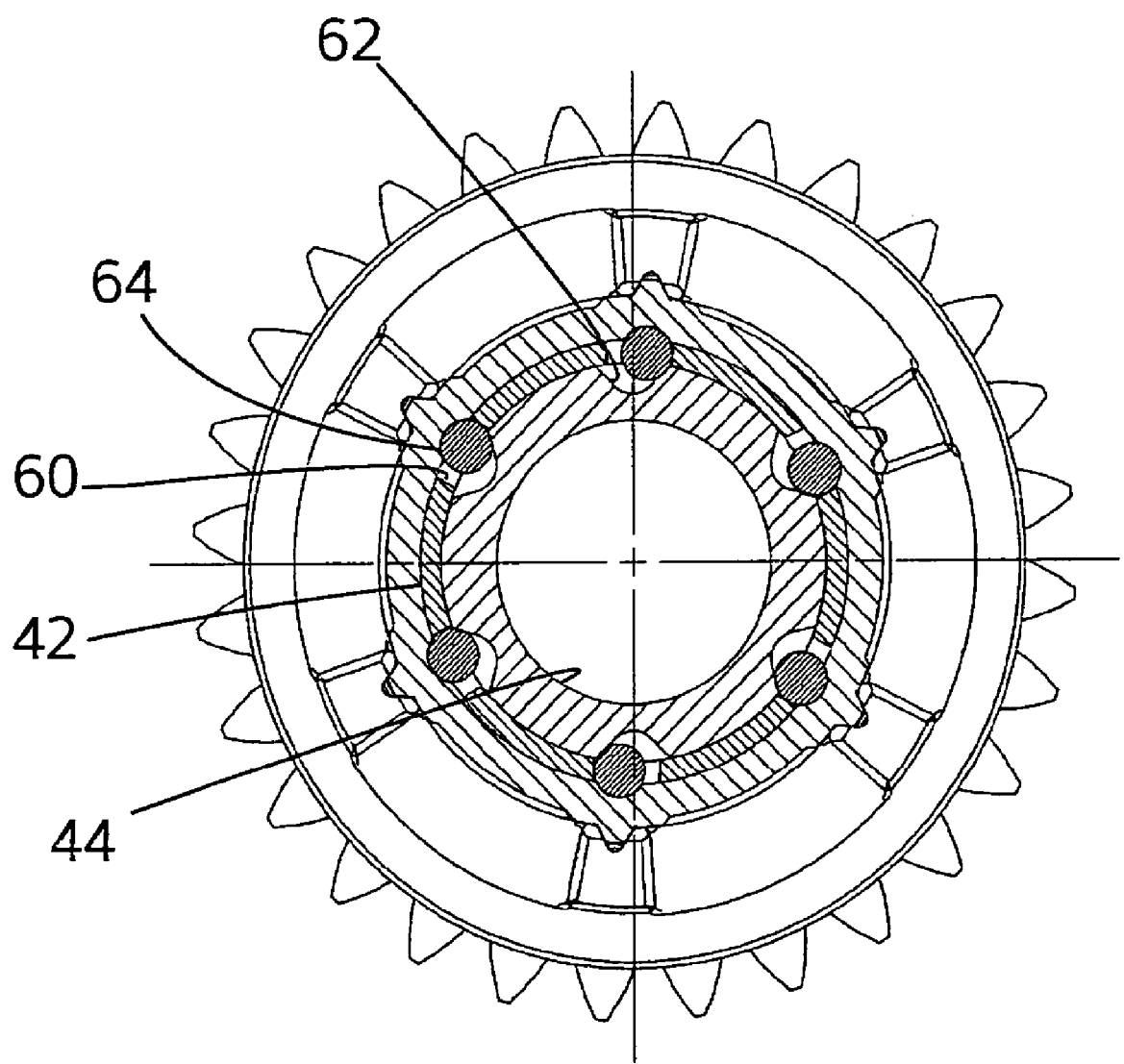
FIG. 6 is an end view of the mainshaft assembly of the embodiment of FIG. 1.

The mainshaft assembly 10 has four spur gears 30, 32, 34, 36 each of which is in mesh with a respective spur laygear of the layshaft assembly 12. The sizes of the spur gears 30, 32, 34, 36 are such that they are arranged along a straight axis. The mainshaft assembly is central to the operation of this embodiment, so it will now be described in detail with reference to FIGS. 4 and 5.

The four spur gears 30, 32, 34, 36 of the mainshaft gears provide $1^{st}$ to $4^{th}$ speeds, the four speeds being each incrementally higher in ratio than the previous gear, i.e., $4^{th}$ is higher than $3^{rd}$, and so forth. The gears are not arranged in ratio-order as is common in most gearboxes. Rather, they are arranged such that a first adjacent pair of gears (referred to as the even-speed pair) 30, 32 provide $4^{th}$ and $2^{nd}$ gears respectively, while the second pair (referred to as the odd-speed pair) 34, 36 provide $3^{rd}$ and $1^{st}$ gears respectively. The requirement in general is that adjacent speeds should not share a hub so that a speed change can be effected by changing which one of two hubs is transmitting drive to the mainshaft.

Each gear 30, 32, 34, 36 is supported on a respective bearing 40, which in turn is mounted on a cage 42 that extends under all four gears. The cage 42 is carried on a rotatable mainshaft 44. (The bearings 40 could be bushes rather than rotating element bearings, as in this embodiment.) The cage 42 is carried directly on the mainshaft 44 such that it can rotate upon the mainshaft 44. In alternative embodiments, bushes or bearings may be disposed between the cage 42 and the mainshaft 44.

Mounted on the cage between the gears of the even-speed pair and the odd-speed pair, concentric to the mainshaft 44, is a respective hub 50, 52. Mounted on each hub 50, 52 is a respective dog ring 54, 56, in this embodiment, connected through a spline drive. The number of splines can vary between embodiments; in this case there are six. Thus, the dog rings 54, 56 can slide axially with respective to the corresponding hub 52, 54, but cannot rotate with respect to it. Each dog ring can slide between three operative positions: a central neutral position (shown in FIG. 5) in which it is spaced axially from both of the corresponding spur gears, or displaced from the central position in one or other direction to a respective drive position to engage one or other spur gear. When in a drive position, the dog ring engages with dog formations on the corresponding spur gear to lock that gear to the hub upon which it is carried such that the hub and the gear rotate together. This sliding movement is effected by selector forks 70 of the selector assembly 14.

Each hub 50, 52 has a series of internal axially-aligned grooves 58 and is mounted on the cage 42. In this example, there are six such grooves, but other embodiments may have more or fewer. The cage 42 has a series of rectangular slots 60, each slot 60 being disposed approximately radially inwardly from a respective one of the grooves 58. Likewise, the mainshaft 44 has a series of grooves 62, each being disposed approximately radially inwardly from a respective one of the slots 60. Thus, a space is enclosed between the internal grooves 58 of the hubs, the slots 60 and the grooves 62 of the mainshaft 44 and located within each space is a respective cylindrical roller 64.

The grooves 58 of the hubs 50, 52 are curved such that each roller 64 fits closely to the base of its groove 58. The bases of the grooves 62 of the mainshaft 44 are also curved with a radius similar to that of the rollers 64. However, each of the grooves 62 of the mainshaft 44 has sloping sidewalls upon which the rollers 64 can slide, thus allowing the rollers 64 a small amount of angular rotation around the mainshaft. The width of each slot 60 is slightly greater than the diameter of a roller 64. When a roller is located in the base of its mainshaft groove 62, its radially outermost extent does not project beyond the radially outer surface of the cage 42.

The slots 60 in the cage 42 are sized to allow the rollers 64 to disengage from the hubs 50, 52 as required during operation. The cage 42 ensures that all of the rollers 64 under any one hub are aligned on the same side of the grooves 62 in the mainshaft 44 as required during operation of the system. The purpose of the rollers is to allow the hubs 50, 52 to be coupled to or uncoupled from the mainshaft 44, whereby when coupled, a hub is caused to rotate with the mainshaft and when uncoupled can rotate with respect to it. The mechanism by which this occurs will now be described.

Figure 7:
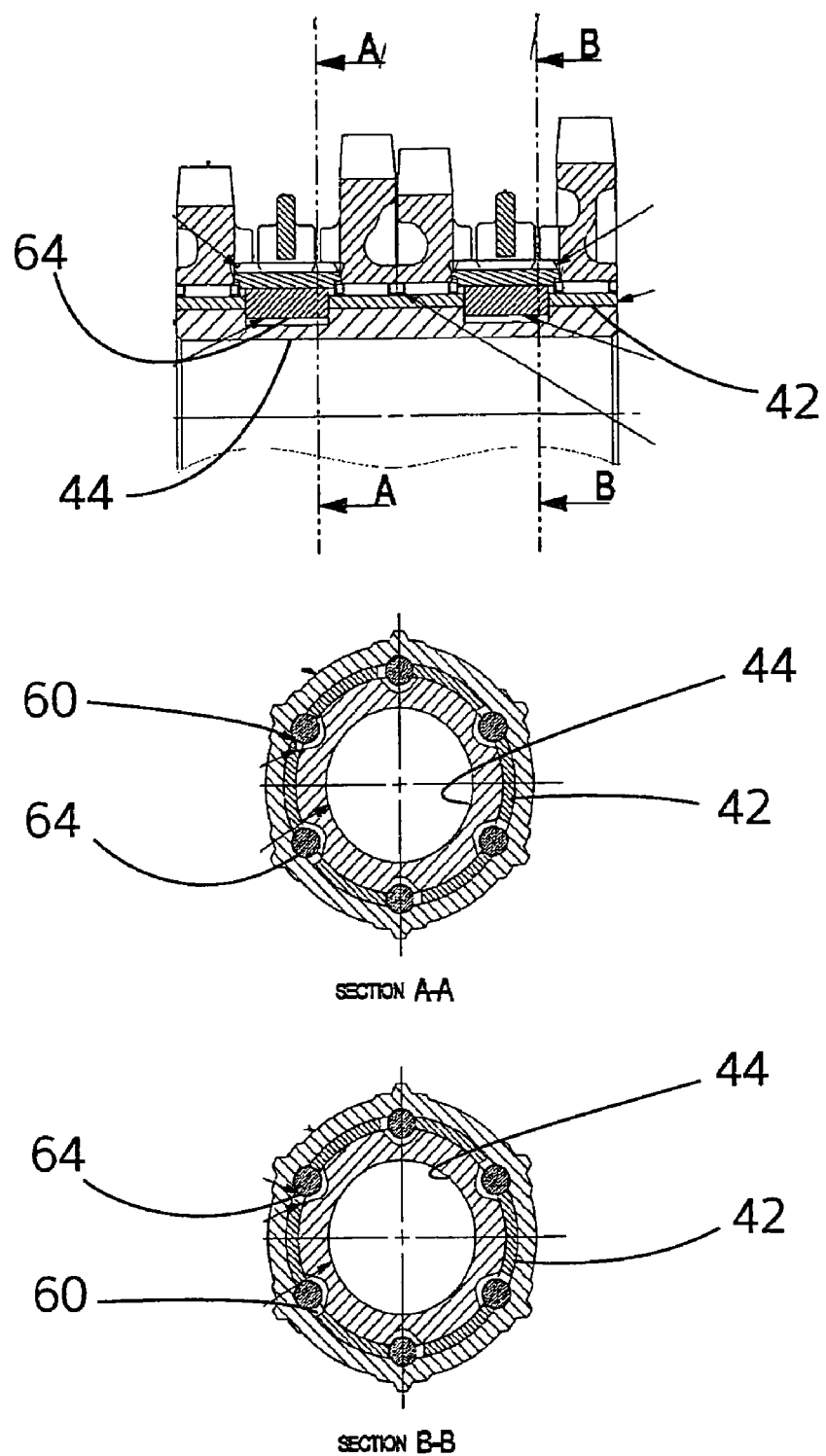
FIGS. 7 to 13 represent a sequence of operation of a mainshaft assembly embodying the invention.

Consider first the state of the mainshaft assembly 10 as shown in FIG. 7. Both dog rings 54, 56 are in their central positions, so all of the spur gears 30, 32, 34, 36 are free to rotate with respect to the mainshaft 44, and the cage 42 and rollers 60 are free. Thus, the gearbox is in neutral, no drive being transmitted from the layshaft assembly 12 to the mainshaft assembly 10.

Figure 8:
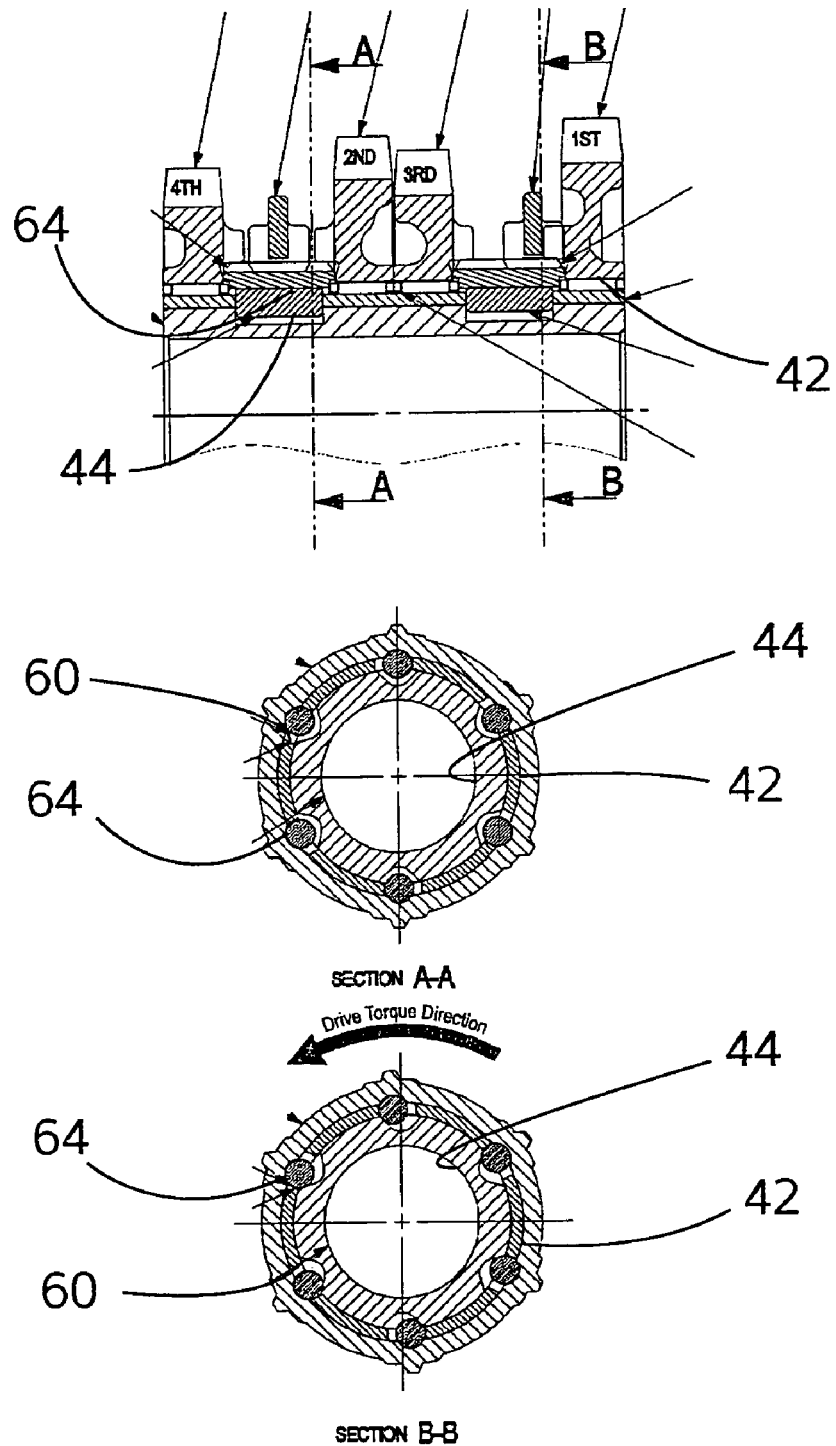

To engage $1^{st}$ gear on drive the dog ring 56 of the odd-speed pair is moved across to its drive position with respect to the $1^{st}$ spur gear 36, as shown in FIG. 8. Section B-B through $1^{st}$ gear in FIG. 8 shows the drive torque direction where the torque is taken through the hub 52 and the rollers 60 into the mainshaft 44. The cage 42 is rotated fully in the direction of the drive torque by the rollers 60.

Figure 9:
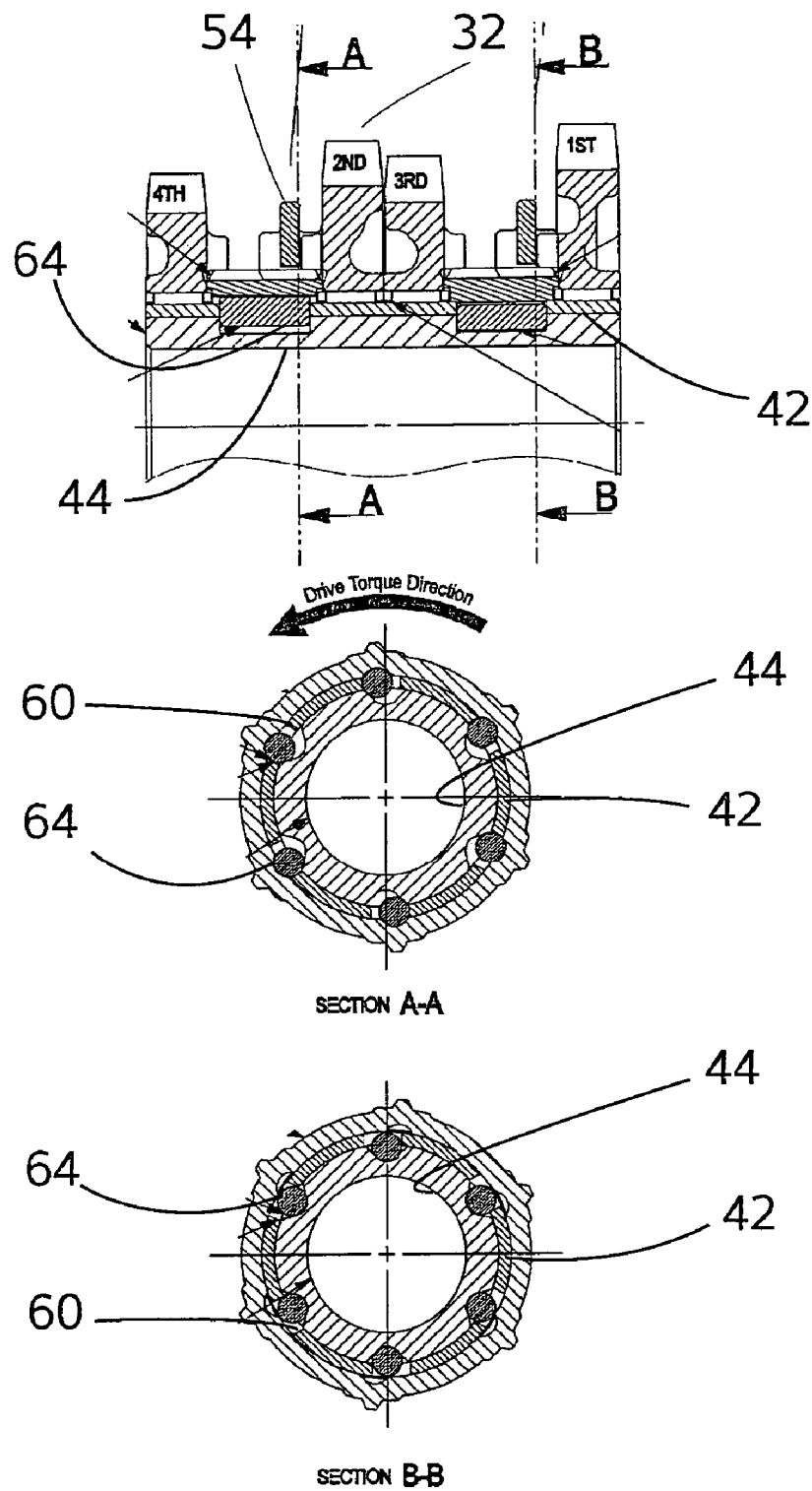

If the vehicle is accelerating, it is likely that the next gear to be required will be $2^{nd}$, and the way in which this is achieved is shown in FIG. 9. As will be seen, $2^{nd}$ spur gear 32 has now been engaged on drive by dog ring 54 of the even-speed pair. Note that $1^{st}$ gear 36 is also still engaged by the dog ring 56 of the odd-speed pair. Section A-A through $2^{nd}$ gear 32 shows that the drive torque is taken through the even-speed hub 52 and rollers 60 to the mainshaft 44. The rollers 60 have rotated the cage 42 fully in the direction of the drive torque due to the drive torque. Section B-B through $1^{st}$ gear shows that, due to the fact that the mainshaft 44 is now rotating faster than $1^{st}$ gear (which is still engaged) the odd-speed hub 50 is now rotating slower than the even-speed hub 52. As the cage 42 is forced fully in the direction of the drive torque by the even-speed hub 52 and rollers 60 there is now sufficient space for the $1^{st}$ gear rollers 60 to be forced into the grooves in the mainshaft 44. This allows the odd-speed hub 50 to rotate slower than even-speed hub 52 and therefore not transmit drive. Thus, $2^{nd}$ gear has been engaged without the need to disengage $1^{st}$ gear.

Figure 10:
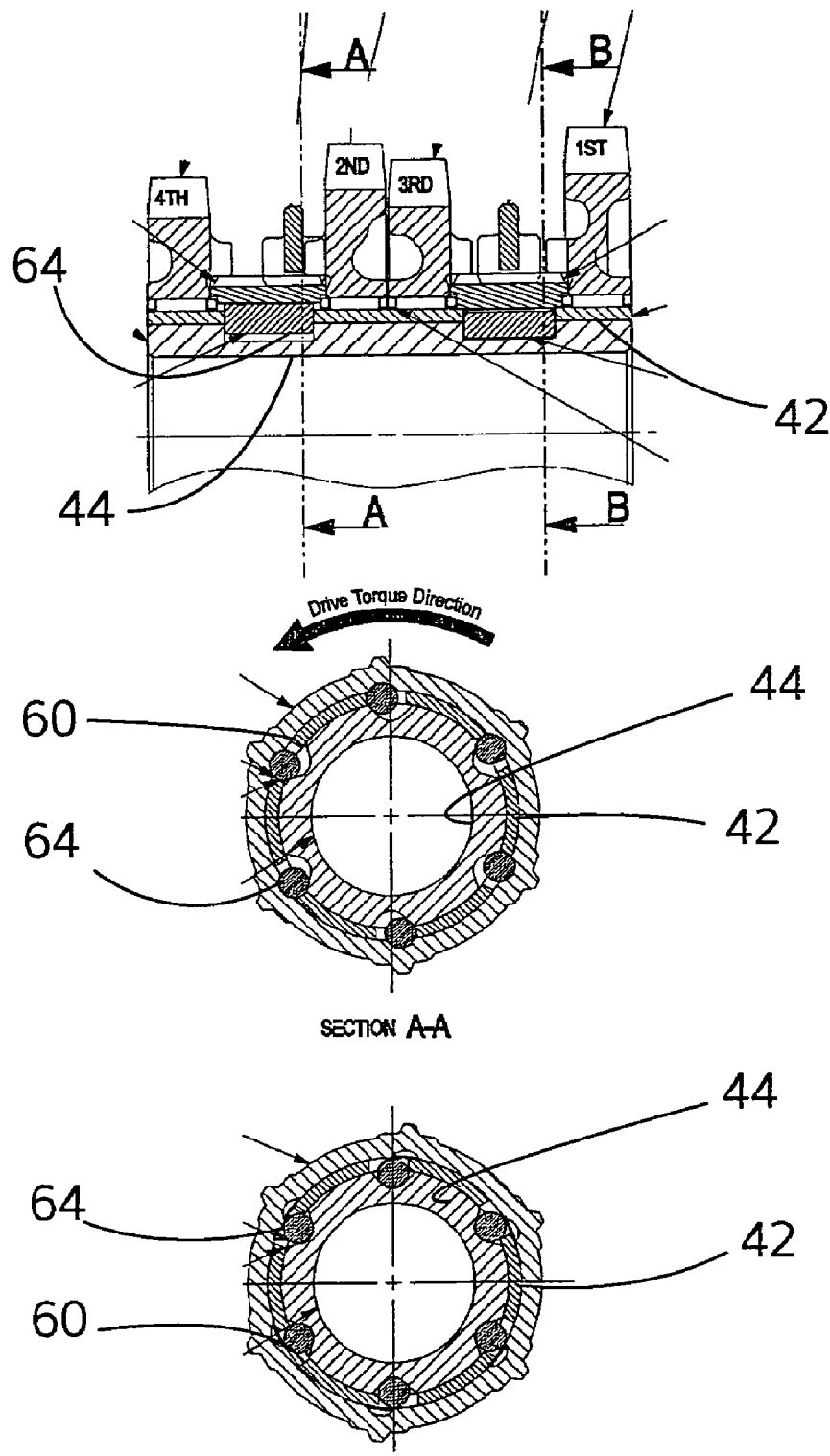

Once $2^{nd}$ gear has been engaged, as described above, the dog ring 56 of the odd-speed pair is withdrawn from engagement with the $1^{st}$ speed spur gear 36 to its central neutral position, as shown in FIG. 10. The even-speed hub dog ring 54 remains in engagement with the $2^{nd}$ spur gear 32. The $1^{st}$ spur gear 36 is now free to rotate on its bearing 40 as it is no longer joined to the odd-speed hub 52 by dog ring 56—this is essential because there is no relative rotational motion between the odd-speed hub 52 and mainshaft 44.

This procedure can be repeated, using further components of the mainshaft assembly, to perform further changes to $3^{rd}$ and $4^{th}$ gears.

The sequence of operation to accomplish downchanges will now be described. Before a downchange, engine torque is reduced such that it is now imposing a drag on the vehicle—that is, the direction of torque being transmitted by the gearbox is reversed.

Figure 11:
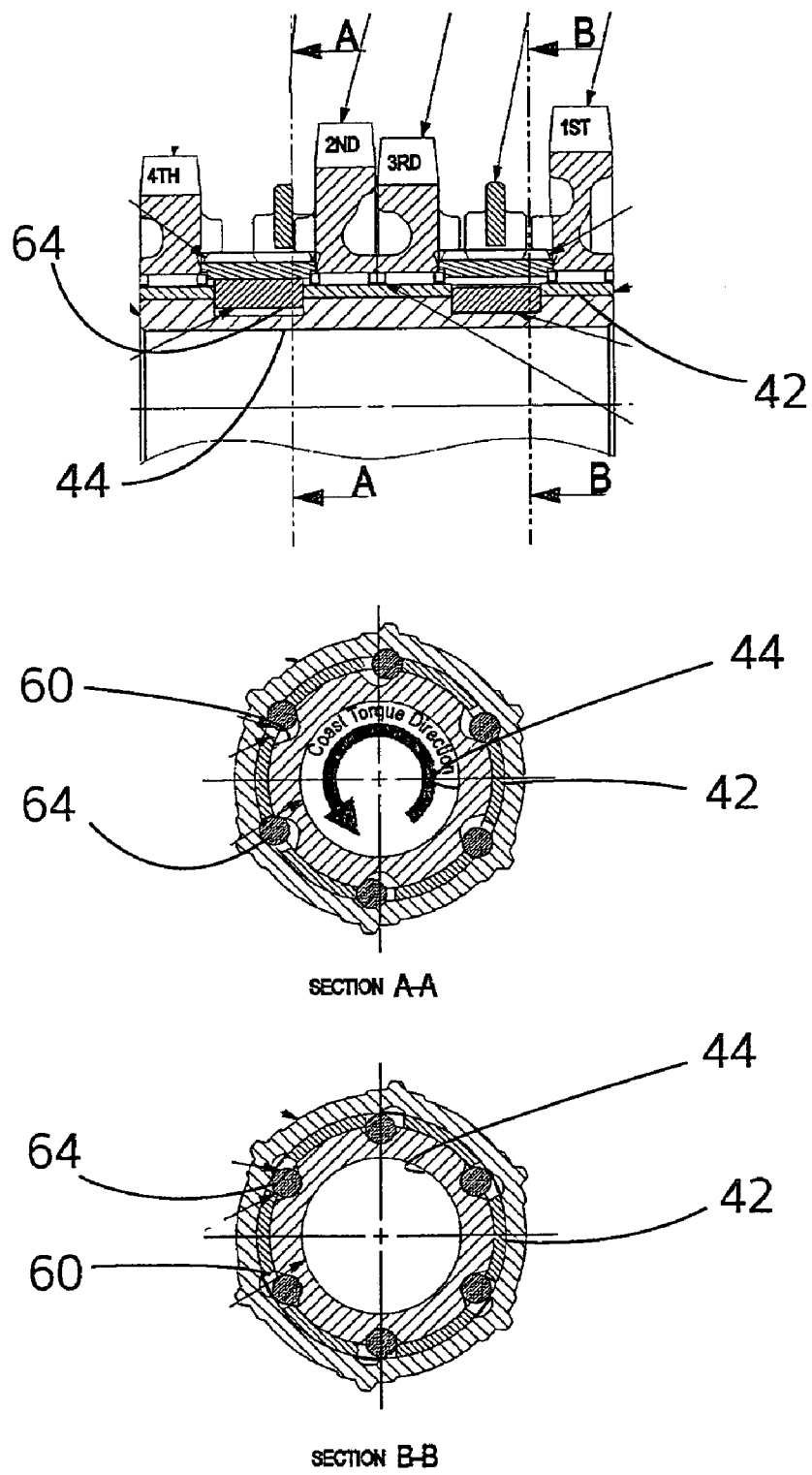

FIG. 11 shows the gearbox with $2^{nd}$ gear engaged but no drive torque being applied, instead a coast torque is being applied to the gearbox, for example by the vehicle slowing. When compared to FIG. 10, section A-A through $2^{nd}$ gear shows that the even-speed hub 52 has now moved rotationally in the opposite direction to the direction of rotation relative to the mainshaft 44, and this has also rotated the rollers 60 in the same relative direction. The coast torque is transmitted from the mainshaft 44 through the rollers 60 into the even-speed hub 52 and thence to the even-speed dog ring 56 and the $2^{nd}$ speed spur gear 32. The change in torque direction has also forced the cage 42 to move to a coast position.

Figure 12:
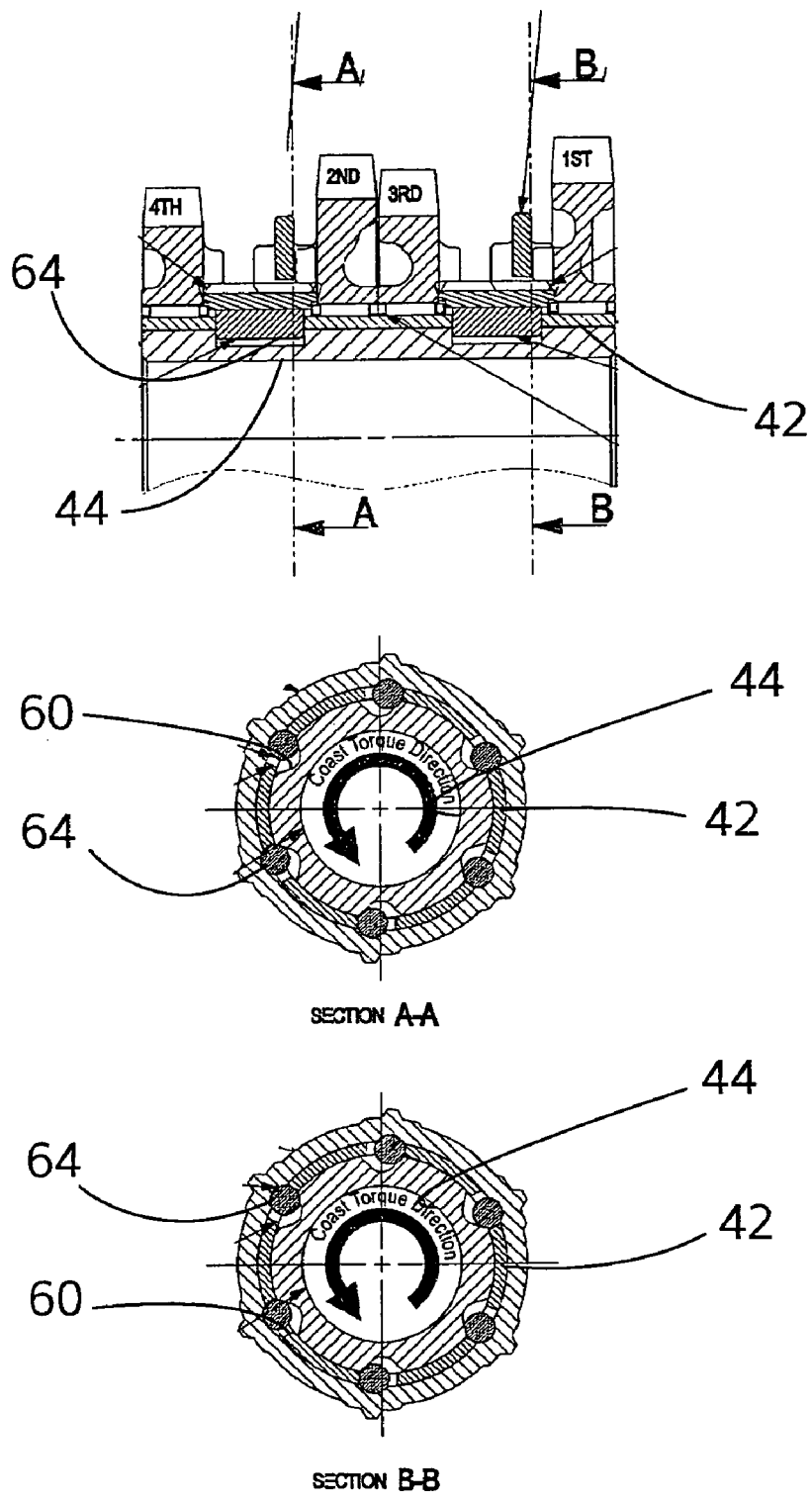

When the change to $1^{st}$ gear is initiated, the components adopt the positions shown in FIG. 12. The odd-speed dog ring 54 has now also been engaged with the first speed spur gear 36 on coast. When compared to FIG. 11, the coast torque is now being taken by the slowest gear, the torque path being from $1^{st}$ gear 36 through the odd-speed dog ring 54, the odd-speed hub 50 through rollers 60 into the mainshaft 44, as shown in section B-B. The rollers 60 are forced in the opposite direction to the direction of rotation by the odd-speed hub 50. The cage 42 is already in the coast position because of the drive direction. The even-speed hub 52 is rotating faster than the odd-speed hub 50 and therefore forces the rollers 60 into the grooves 62 in mainshaft 44 which allows the hub to rotate with respect to the mainshaft 44, as shown in section A-A.

Figure 13:
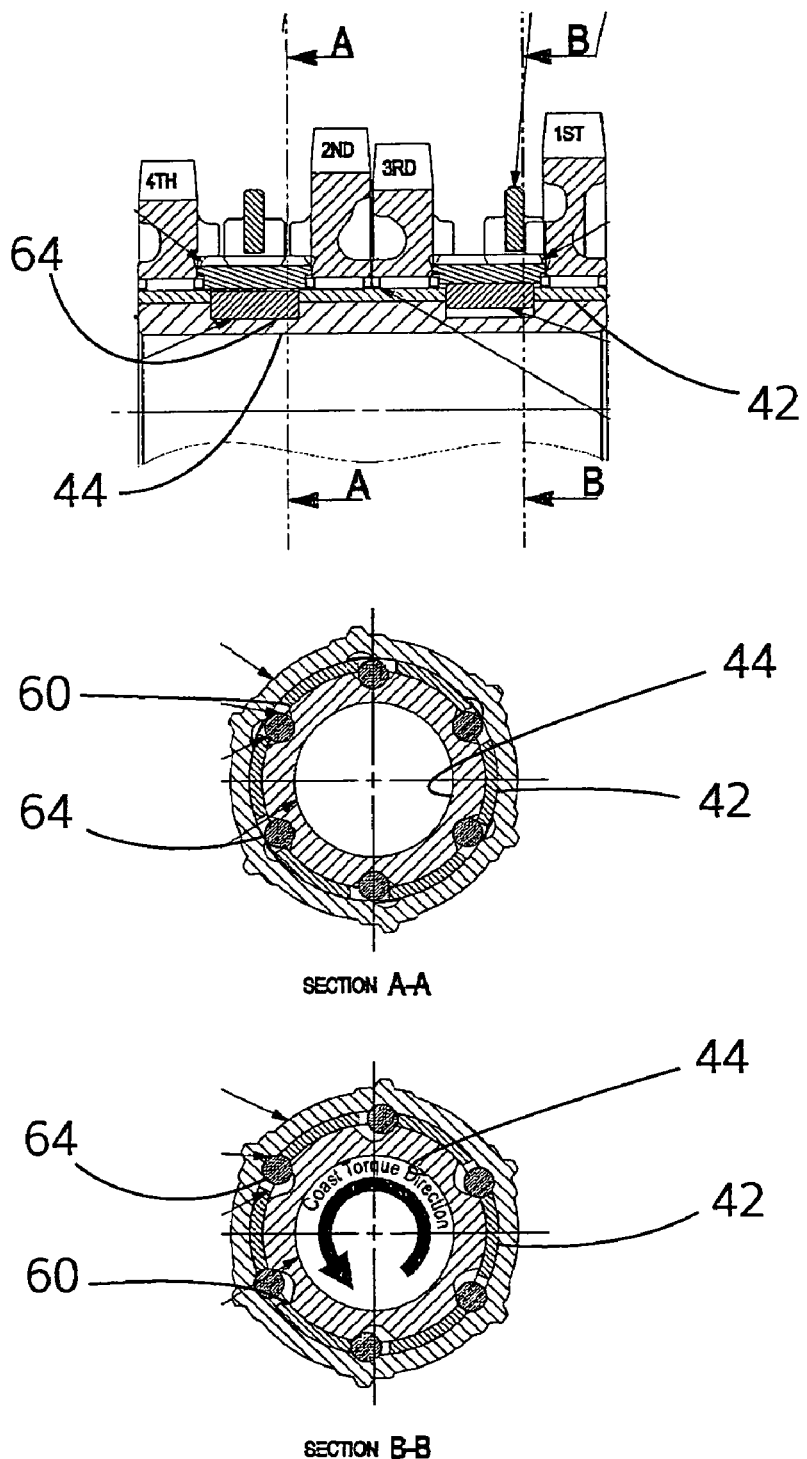
Figure 14:
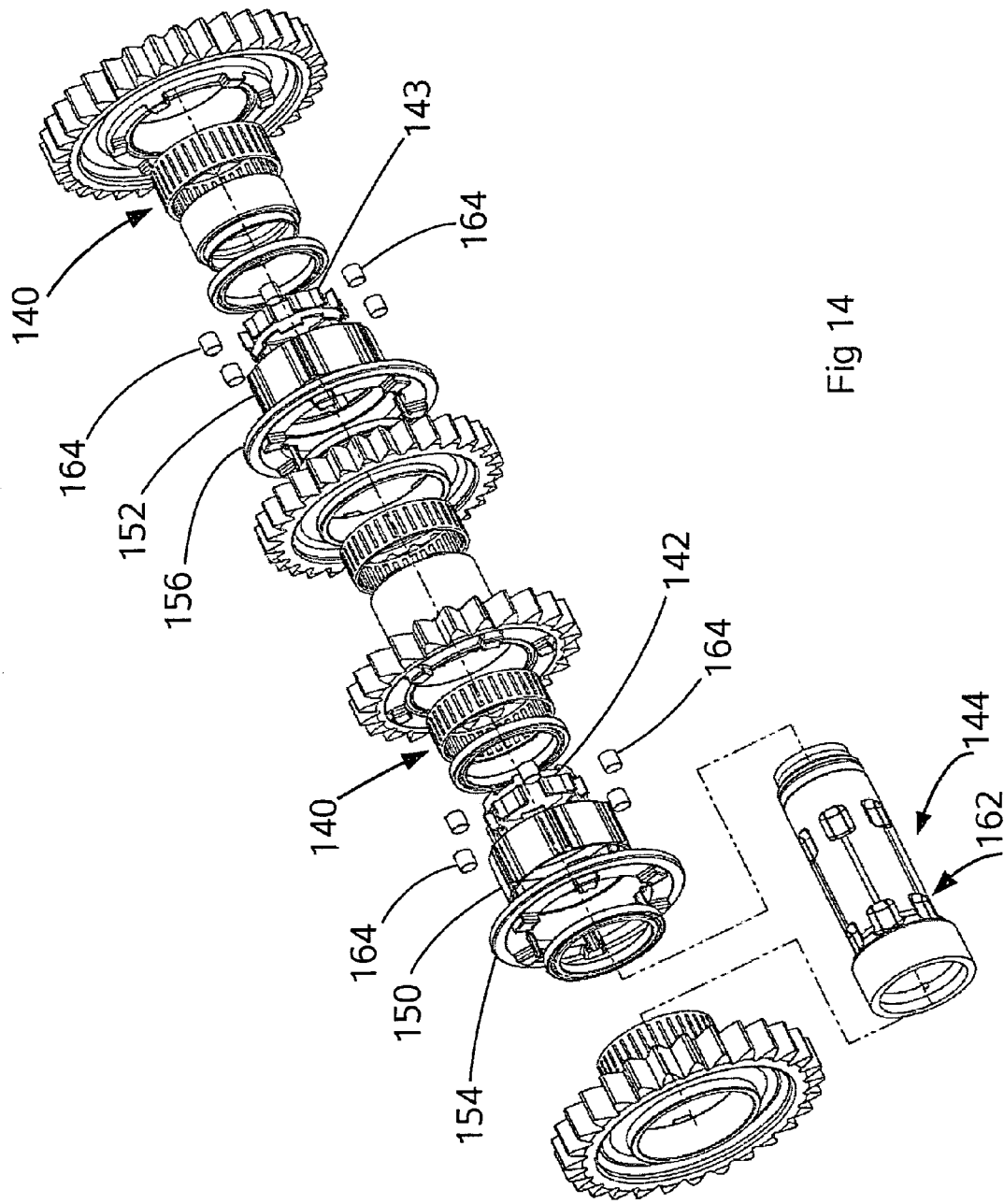
FIG. 14 is an exploded view of a mainshaft assembly of a second embodiment of the invention.
Figure 15:
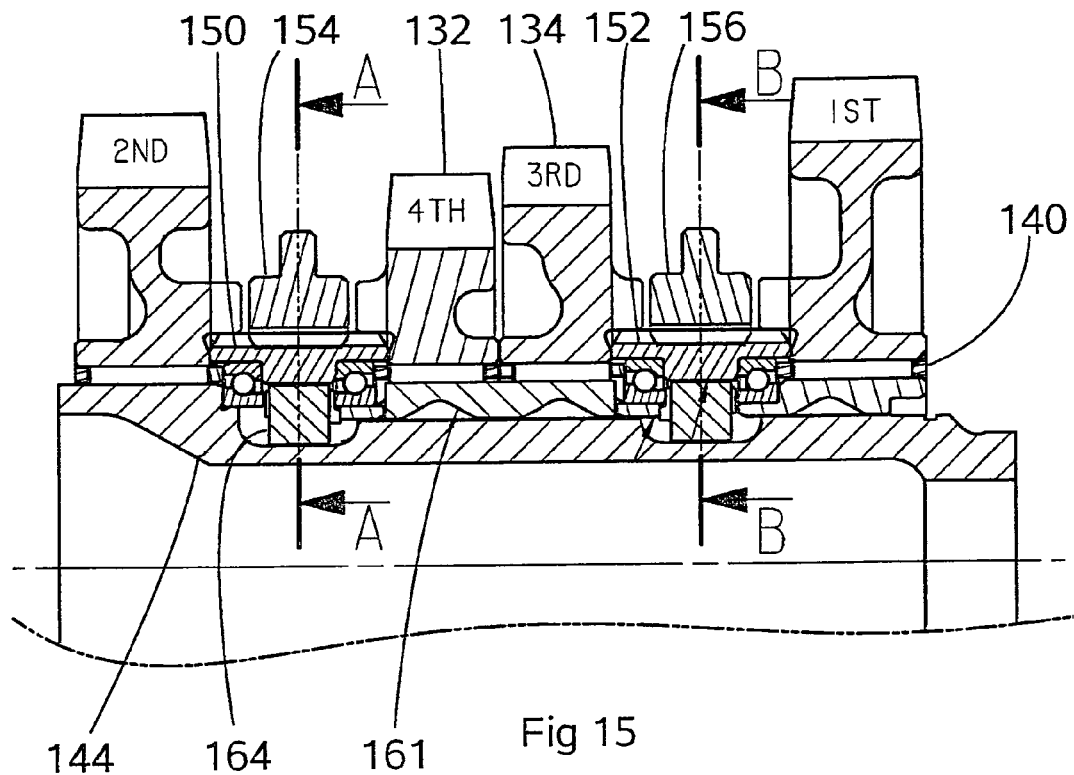
FIG. 15 is a cross-sectional view of a mainshaft assembly of the second embodiment with no gear selected (i.e., in neutral)

The even-speed dog ring 56 is then disengaged from the $2^{nd}$ speed spur gear 32 to its neutral position, meaning that only the $1^{st}$ speed spur gear 36 is engaged to transmit torque in either coast or drive. This is shown in section B-B of FIG. 13.

The sequence can now restart (i.e., changing up from $1^{st}$ gear to $2^{nd}$ gear and so on), and then back down to $1^{st}$ gear as required by the vehicle operation.

The selector assembly 14 is substantially conventional, using selector forks 70 slidably mounted on a selector shaft 76 to slide the dog rings 54, 56 on the hubs 50, 52. The selector forks 70 are moved by a rotatable shaft 72 having cam grooves 74 that are tracked by cam followers on the selector forks 70. Rotation of the selector shaft 76 in a first direction effects upchanges and rotation of the selector shaft in the opposite direction effects downchanges. Clearly, the cam grooves must be shaped to ensure that the dog rings are engaged and disengaged in the sequence required to effect the changes as described above.

In alternative embodiments, the alternate gears could also be mounted on different shafts and the shift completed between shafts using this cage concept. In place of rollers 60, spherical balls could be used, the slots in the cage being round to accommodate them. The rollers 60 could be shapes in section other than round, for example elliptical, rectangular or square. The grooves in mainshaft 44 and hubs 50, 52 are formed to have an appropriate shape.

A second embodiment of the invention will now be described. This embodiment is a modification of the first embodiment, therefore only those of its features that have been modified will be described in full.

In this embodiment, cylindrical rollers 164 are axially shorter and of larger diameter than the functionally-equivalent cylindrical rollers 64 of the first embodiment. This provides additional space within the hubs 150, 152 for other components. One effect of this is that the dog rings 154, 156 are each carried on a respective hub 150, 152 by a respective pair of ball bearings 140 to provide good support for the dog rings 154, 156 and ensure that no radial loads from the roller drive system will result in misalignment between the dog engagement system of the dog ring and mainshaft gear.

As in the first embodiment, a respective set of rollers 164 is provided for each hub 150, 152. However, in this embodiment, each set of rollers is disposed within a respective roller cage 142, 143, which replaces the single cage 42 of the first embodiment.

Figures 17A, 17B:
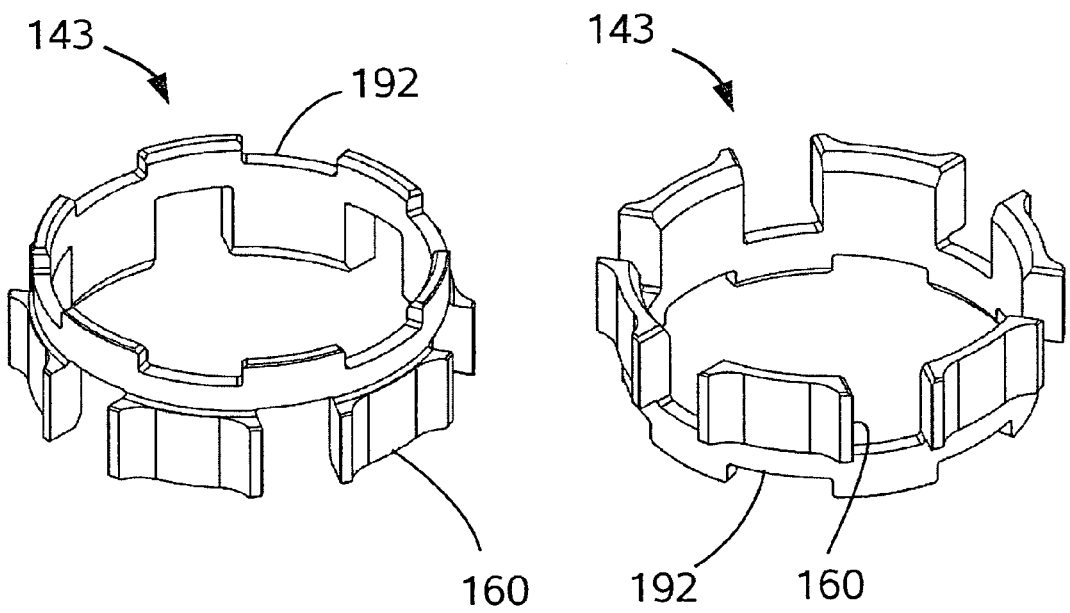
FIGS. 17a and 17b show a roller cage, being a component of the second embodiment of the invention.

Each roller cage 142, 143, as shown in FIG. 17, is a generally ring-shaped one-piece component. It comprises a plurality of lobes 160 (same in number as one set of rollers 164) interconnected by comparatively thin elements. Mutually facing surfaces of adjacent lobes 160 are generally parallel to one another and to a radius of the cage, and are spaced apart by a distance that is a small amount greater than the diameter of the rollers 164. Each roller cage 142, 143 surrounds the mainshaft 144 and can rotate about it concentrically with the axis of the mainshaft 144.

Each of the rollers 164 is retained between a pair of lobes 160, and is located within a groove 158 in the hub and a groove 162 in the mainshaft. Thus, the rollers 164 are located in a manner similar to the rollers 64 in the first embodiment. However, the roller cages constrain the rollers more closely in their correct positions than can the roller cage 60 of the first embodiment.

Figure 16:
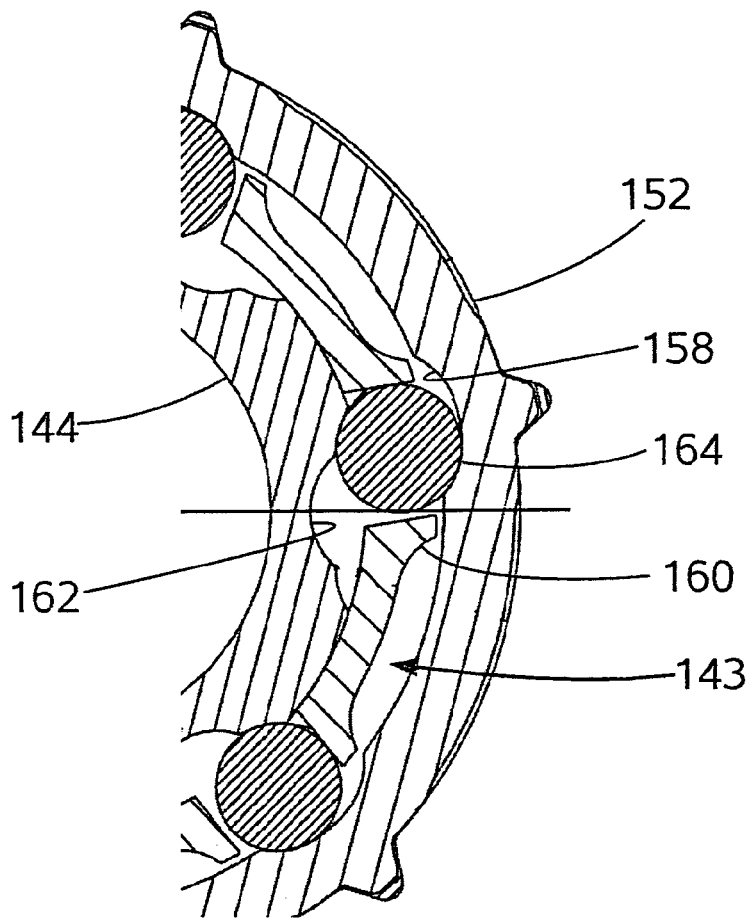
FIG. 16 is a detail of Section B-B from FIG. 14 that shows modified components of this embodiment.

The grooves 162 within the main shaft 144 of this embodiment have a cross-sectional shape that can be seen most clearly in FIG. 16. A central part of each groove 162 is arcuate and has a radius that is substantially the same as that of the roller. Each groove has opposite radiused regions that are also of radius similar to that of the roller 164.

This resists any tendency for the rollers 164 to become disengaged during transmission of high-torque loads.

Figure 18:
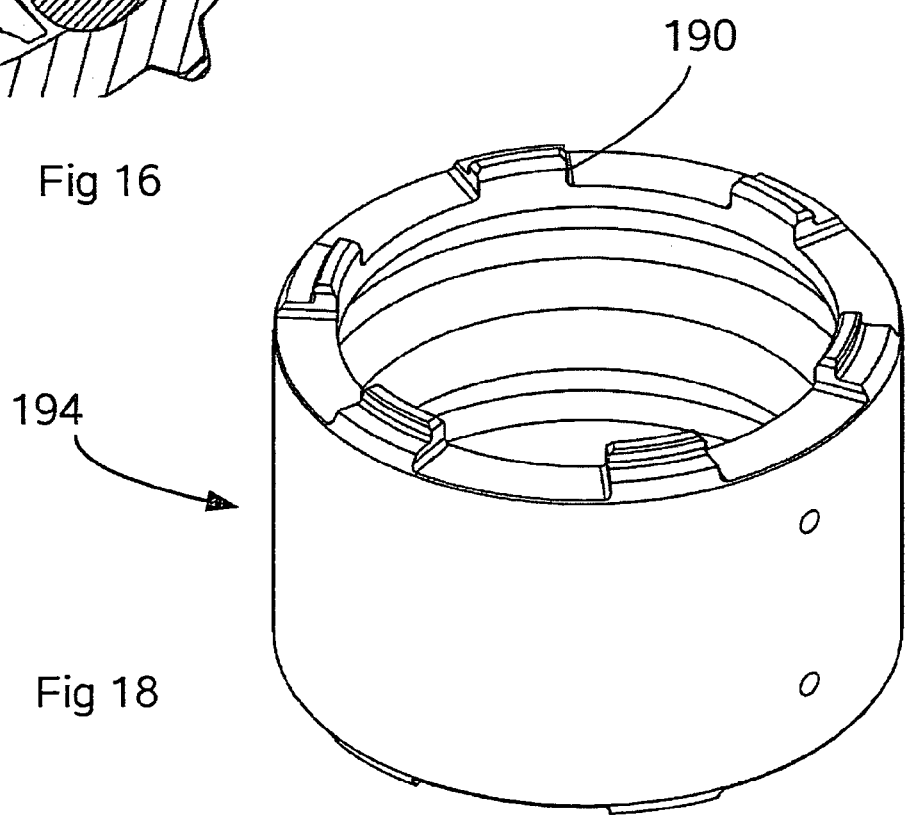
FIG. 18 shows a mainshaft inner track, being a component of the second embodiment of the invention.

Since the cage 60 is omitted from this embodiment, the adjacent hub assemblies are interconnected by a separate tubular component referred to as the ratio inner track 194, shown in FIG. 18. This ratio inner track 194 is located on the outside of the mainshaft 144 and is free to turn relative to the mainshaft assembly. The two adjacent mainshaft gears 132, 134 are each located on the outside of the ratio inner track 194 using respective needle roller bearings 140. The ratio inner track 194 is indexed to each of the two adjacent roller cages 142, 143 by face dogs 190, 192 formed on axial end surfaces of each the ratio inner track 194 and the roller cages 142, 143. The dogs on the roller cages are formed by faces of adjacent lobes 160. This dog drive system allows a controlled amount of backlash between the two roller cages 142, 143 such that this embodiment can operate without loose circumferential control of the rollers present in the first embodiment.

Operation of the embodiment will now be described with reference to FIGS. 19 and 20.

Figure 19:
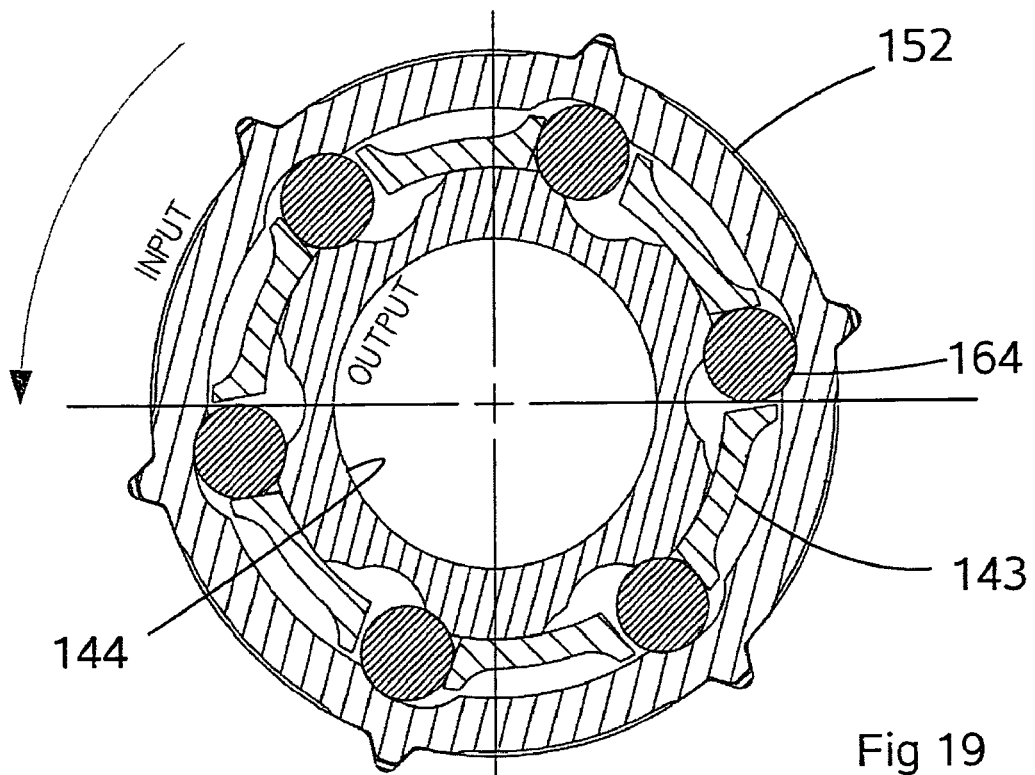
FIGS. 19 and 20 are views of Section B-B from FIG. 14 that show a sequence of operation of the embodiment.
Figure 20:
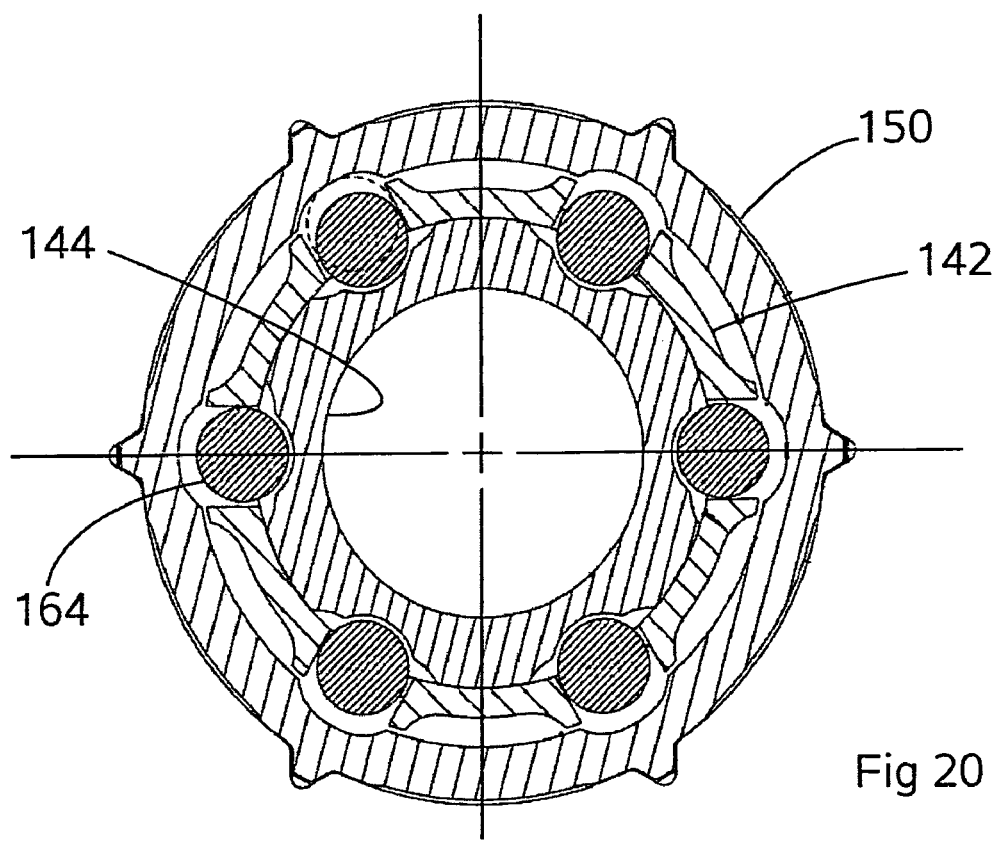

In FIG. 19, $2^{nd}$ gear has just been engaged, on an upchange from $1^{st}$, using the dog ring 154, causing torque to be applied to the even-speed hub 152. This torque input will make the even-speed hub 152 rotate faster than the mainshaft 144, so the roller cage 143 will be dragged forwards causing the drive rollers 164 to be locked into position between the external grooves 162 of the mainshaft 144 and the internal grooves 158 of the even speed hub. Once this occurs, the drive torque will be passed directly to the mainshaft 144 and the newly-selected gear will become operational.

Once $2^{nd}$ gear has become engaged as described above, the mainshaft 144 speed will increase to match the $2^{nd}$ gear input speed, so the mainshaft 144 will turn faster than the hub of the next-lower gear $1^{st}$. The dog drive arrangement between the even-speed roller cage 143, ratio inner track 194 and odd-speed roller cage 142 means that the odd-speed roller cage 142 will quickly increase in speed to match that of the mainshaft 144. As the odd-speed hub 150 will be rotating slower than the mainshaft 144, this will cause drag on the odd-speed roller cage 142, but the limited backlash between the cages 142, 143 and the ratio inner track 194 will force the odd-speed hub 150 to fall only a small angle behind the rotation of the mainshaft 144. This disposition is shown in FIG. 20. At this position relative to the mainshaft, the odd-speed roller cage 142 will prevent the drive rollers 164 from engaging on the overrun side of the mainshaft grooves 162. The mainshaft 144 will therefore 'freewheel' inside the slower-rotating odd-speed hub 150, and no torque will be transferred between the odd-speed hub 150 and the mainshaft 144.

The gearshift from $1^{st}$ to $2^{nd}$ is subsequently completed by movement of the selector fork to disengage the dogs of the previously engaged gear ($1^{st}$) from the adjacent dog ring. At this point, all components of the odd-speed hub assembly will be free to rotate at the same speed as the gearbox mainshaft 144.

As with the first embodiment, the gear selection mechanism will also function in the overrun (deceleration) condition, but with all torque directions reversed.

The embodiments described offer four forward drive ratios. However, in practice, a gearbox that embodies the invention may have additional ratios. For example, a gearbox with six forward speeds and reverse may use the four-speed arrangements described above to provide forward gears 2 to 5, with forward gears 1 and 6 and reverse being provided by conventional means. It is in these intermediate gears that greatest advantage can be gained through the increase in gear-change speed that the invention provides.

What is claimed is:

1. A mainshaft assembly for a gearbox, the mainshaft assembly comprising:
   a mainshaft;
   a first and a second drive gear, each carried for rotation about the mainshaft, each drive gear having a different number of teeth;
   a first and a second hub, each hub being associated with a respective drive gear, each hub having engagement means operable to selectively couple with the drive gear causing it to rotate with the hub or uncouple from the drive gear to allow the drive gear to rotate with respect to the hub;
   respective drive connection means associated with each hub being operative to connect or disconnect the hub to the mainshaft for rotation with it or to allow rotation with respect to it;
   wherein, upon connection of both first and second hub by their respective engagement means to each corresponding drive gear, the drive connection means operates to connect one of the hubs to the mainshaft when torque is applied to the mainshaft through the hub and to connect the other one of the hubs to the mainshaft when torque is applied to the hub through the mainshaft.

2. A mainshaft assembly according to claim 1 in which, when the gearbox is transmitting torque in a direction that corresponds to acceleration of a vehicle to which it is fitted, the connection means operates to connect the hub that is associated with the drive gear that has the higher drive ratio on drive and lower drive ratio on coast.

3. A mainshaft assembly according to claim 1 in which at least one hub is associated with two drive gears, the engagement means being operable to selectively couple with one or other drive gear or uncouple from both drive gears.

4. A mainshaft assembly according to claim 3 in which drive gears that provide neighbouring ratios do not share a hub.

5. A mainshaft assembly according to claim 4 in which the drive gears for successive speeds may be carried on successive hubs disposed along the mainshaft.

6. A mainshaft assembly according claim 1 in which each engagement means includes a dog clutch that can engage with or disengage from dogs on a drive gear.

7. A mainshaft assembly according to claim 6 in which the dog clutch is embodied by a dog ring that is carried on the hub.

8. A mainshaft assembly according to claim 7 in which the dog ring is carried such that it can slide axially on the hub and is constrained to rotate with the hub, the dog ring being coupled or uncoupled by sliding upon the hub.

9. A mainshaft assembly according to claim 8 in which the dog ring is splined to the hub.

10. A mainshaft assembly according to claim 1 in which the connection means includes connection elements movable between a deployed position in which they prevent relative movement between the hub and the mainshaft and a withdrawn position in which such relative movement is allowed.

11. A mainshaft assembly according to claim 10 in which the connection elements are cylindrical metal rollers.

12. A mainshaft assembly according to claim 10 in which in the withdrawn position, each connection element may be received within a respective recess in one of the mainshaft and the hub.

13. A mainshaft assembly according to claim 12 in which, in the deployed position, the connection elements project from the recesses to engage with formations in the other of the mainshaft and the hub.

14. A mainshaft assembly according to claim 10 in which the connection means further includes a control component to move the connection elements between their withdrawn and their deployed position.

15. A mainshaft assembly according to claim 14 in which the control component comprises a hollow cylindrical cage that surrounds the mainshaft and which extends between the hubs and the mainshaft.

16. A mainshaft assembly according to claim 15 in which the cage includes slots (60) within which the connection elements are located.

17. A mainshaft assembly according to claim 16 in which the slots have a circumferential extent that is greater than that of the connection elements.

18. A mainshaft assembly according to claim 14 in which the control component is a ring-shaped component having a plurality of circumferentially-spaced lobes, the connection elements being received between the lobes.

19. A mainshaft assembly according to claim 14 in which the connection elements are moved between their withdrawn and their deployed position by rotation of the control component with respect to the mainshaft.

20. A mainshaft assembly according to claim 19 in which rotation of the control component in a first direction is effected by relative movement between the control component and the mainshaft and rotation of the control component in the opposite direction is effective by relative movement between the cage and a hub.

21. A mainshaft assembly according to claim 14 in which the control component allows limited relative rotational movement of the drive connection means.

22. A mainshaft assembly according to claim 14 in which the control component comprises two interconnected parts between which limited rotational movement can take place.

23. A gearbox that includes a mainshaft assembly wherein the mainshaft assembly comprises:
a mainshaft;
a first and a second drive gear, each carried for rotation about the mainshaft, each drive gear having a different number of teeth;
a first and a second hub, each hub being associated with a respective drive gear, each hub having engagement means operable to selectively couple with the drive gear causing it to rotate with the hub or uncouple from the drive gear to allow the drive gear to rotate with respect to the hub;
respective drive connection means associated with each hub being operative to connect or disconnect the hub to the mainshaft for rotation with it or to allow rotation with respect to it;
wherein, upon connection of both first and second hub by their respective engagement means to each corresponding drive gear, the drive connection means operates to connect one of the hubs to the mainshaft when torque is applied to the mainshaft through the hub and to connect the other one of the hubs to the mainshaft when torque is applied to the hub through the mainshaft.

24. A gearbox according to claim 23 in which each of the drive gears of the mainshaft assembly is in mesh with a respective laygear.

25. A gearbox according to claim 24 in which the laygears are constrained to rotate together.

26. A gearbox according to claim 23 including a selector assembly operable to engage or disengage the engagement means.

27. A gearbox according to claim 26 in which the selector assembly is a sequential selector.

28. A gearbox according to claim 23 in which a layshaft is its input and the mainshaft is its output.

* * * * *